(12) United States Patent
Bocko et al.

(10) Patent No.: US 6,747,572 B2
(45) Date of Patent: Jun. 8, 2004

(54) AUTONOMOUS SENSOR SYSTEM FOR REMOTE SENSING AND SIGNAL TRANSMISSION

(75) Inventors: Mark F. Bocko, Caledonia, NY (US); Richard W. Lally, Virginia Beach, VA (US)

(73) Assignee: Oceana Sensor Technologies, Inc., Virginia Beach, VA (US)

( * ) Notice: Subject to any disclaimer, the term of this patent is extended or adjusted under 35 U.S.C. 154(b) by 393 days.

(21) Appl. No.: 09/774,209

(22) Filed: Jan. 30, 2001

(65) Prior Publication Data
US 2002/0145538 A1 Oct. 10, 2002

(51) Int. Cl.$^7$ .............................................. G08B 21/00
(52) U.S. Cl. ............................ 340/870.16; 136/236.1; 257/467
(58) Field of Search .................. 340/870.16; 136/236.1, 136/201; 257/467, 470

(56) References Cited

U.S. PATENT DOCUMENTS

| | | |
|---|---|---|
| 4,149,025 A | 4/1979 | Niculescu |
| 4,493,939 A | 1/1985 | Blaske et al. |
| 4,782,708 A | 11/1988 | Harrington et al. |
| 4,940,976 A | 7/1990 | Gastouniotis et al. |
| 5,609,032 A | 3/1997 | Bielinski |
| 5,705,770 A | 1/1998 | Ogasawara et al. |
| 5,881,560 A | 3/1999 | Bielinski |
| 5,931,000 A | 8/1999 | Turner et al. |
| 5,956,569 A | 9/1999 | Shiu et al. |
| 6,012,675 A | 1/2000 | Cocatre-Zilgien |
| 6,066,902 A | 5/2000 | Maurio et al. |
| 6,100,463 A * | 8/2000 | Ladd et al. .................. 136/201 |

* cited by examiner

*Primary Examiner*—Timothy Edwards
(74) *Attorney, Agent, or Firm*—Brian B. Shaw, Esq.; Donna P. Suchy, Esq.; Harter, Secrest & Emery LLP

(57) ABSTRACT

An autonomous sensor system is provided for powering sensors using thermoelectric modules driven by thermal energy. The system includes solid-state thermoelectric (TE) modules for the conversion of thermal energy to electrical energy. The TE modules are composed of p-type and n-type semiconductors that are interdigitated so that the p-type and n-type elements form thermocouples. The TE modules derive electrical power from thermal energy available in the immediate environment. The system also includes sensors that are powered by the TE module, wherein a corresponding free space signal is generated.

42 Claims, 6 Drawing Sheets

Cold-Side Temperature
vs.
A/l and T(hot-side)

Current vs. A/l and
Element Width w (cm)
Th - Ta = 50°C (AR = 1)

TE Module Voltage and Current
vs.
Number of Couples

AUTONOMOUS SENSOR SYSTEM FOR REMOTE SENSING AND SIGNAL TRANSMISSION

FIELD OF THE INVENTION

The present invention relates to autonomous sensor systems and more particularly, to thermoelectrically powered autonomous sensor systems that transmit a sensor signal via wireless communication to a remote receiver.

BACKGROUND OF THE INVENTION

Condition based maintenance is important to industry as well as the military for sustaining the performance of machine systems. As the machine systems become increasingly complex and expensive, substantial costs are typically associated with the maintenance of the systems. The lack of accurate monitoring often results in the maintenance being performed after a failure of the system. The potential for catastrophic failure as well as unscheduled downtime of the system, becomes an expensive component of operations. Therefore, maintenance is often performed prior to any failure, or need. While such premature maintenance typically avoids catastrophic failure as well as unscheduled downtime of the system, the premature maintenance represents a substantial amount of unnecessary labor and parts. Thus, the premature maintenance regime also increases costs.

To assist in maintenance scheduling, monitoring systems locate a sensor at a location that can be reached by a wire, cable or line for providing power and sending data. However, connecting the sensor to an interconnecting wire creates additional costs in the monitoring system as well as limits the available locations for the sensors. Incomplete coverage of relevant areas by wired sensors limits the available data and hence knowledge of the system condition.

Therefore, the need exists for an autonomous sensor assembly that can derive its power from the environment. The need also exists for an autonomous sensor assembly that can provide a signal corresponding to a sensed condition, as well as transmit the signal in a wireless communication. A need exists for a compact autonomous sensor that can be operably located without interfering with the monitored device.

SUMMARY OF THE INVENTION

The present invention provides an autonomous sensor system that can be powered by scavenged or dedicated thermal energy for sensing, generating and wirelessly communicating a signal corresponding to a sensed condition. The present invention thereby provides a compact autonomous sensor powered from an environmental energy source, wherein resulting signals are transmitted without requiring a cabled or wired interconnection. Thus, the present invention allows increased spatial distribution of sensors, while reducing installation costs. The autonomous sensor system can be employed on any of a variety of devices, including but not limited to pumps, compressor wheels, turbines, motors and generators.

The autonomous sensor system includes a thermoelectric module for converting scavenged or dedicated thermal energy from the operating environment to electricity. The generated electricity is used to power an associated sensor and transmit a corresponding signal.

The invention further contemplates signal conditioning or processing prior to transmission. The system can include digital signal processors located at the sensor, wherein the digital signal processors are powered by the locally generated electricity from the thermoelectric module.

The autonomous sensor system can be modularized for a given operating environment, thereby permitting ease of installation and sufficient coverage of a sensed area. Further, this autonomous sensor system can be retained in housings constructed for specific operating environments.

DETAILED DESCRIPTION OF THE PREFERRED EMBODIMENTS

Figure 1:
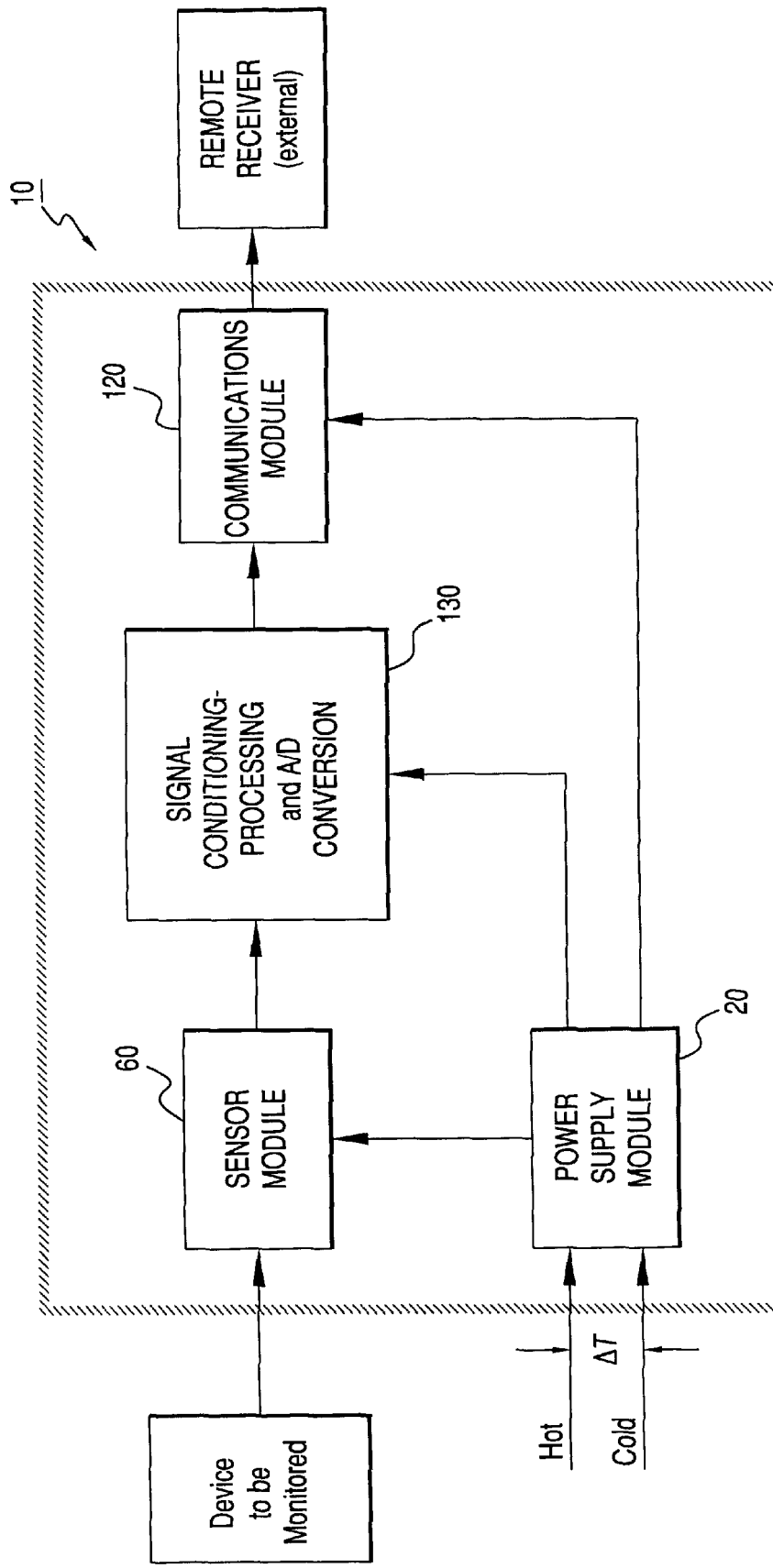
FIG. 1 is a schematic of an autonomous sensor system.

Referring to FIG. 1, the present invention includes an autonomous sensor system 10 having a power supply module 20, a sensor module 60 and a communication module 120. The sensor system 10 generates a signal corresponding to a sensed condition and transmits a corresponding signal via a wireless communication. The wireless communication can be directed to a central receiving station, a relay or a single receiving station.

Power Supply Module

Figure 2:
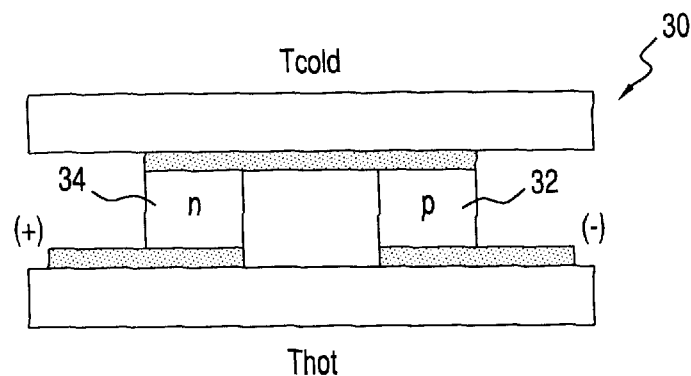
FIG. 2 is a side elevational view of a representative p-type/n-type couple.
Figure 3:
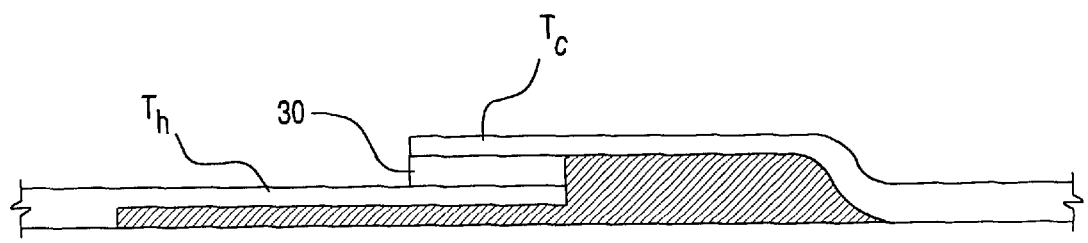
FIG. 3 is a side elevational view of an alternative configuration of the p-type/n-type couple.

The power supply module 20 is constructed to generate and provide sufficient electrical power to operate the sensor module and the communication module. The power supply module 20 is constructed to generate electricity from the conversion of dedicated or waste (scavenged) thermal energy in the local operating environment of the system 10. The power supply module 20 includes a thermoelectric module 30 as seen in FIGS. 2 and 3. The thermoelectric module 30 is thermally intermediate a hot side and a cold side.

The thermoelectric module 30 is constructed from a number of p-type 32 and n-type semiconductor elements 34 connected thermally in parallel and electrically in series as shown in FIG. 2. The thermoelectric module 30, and each element 32, 34 has a first, hot side and a second, cold side.

The hot side of the thermoelectric element is held at a temperature $T_h$ and the cold side of the thermoelectric element is at $T_c$. Typically, the cold side is thermally coupled to a radiator 50 with a thermal resistance $R_{HS}$. In a preferred construction, the p-type and n-type semiconductor elements 32, 34 are sized to optimize available power for a given size. The sizing of the thermoelectric module 30 is set forth below.

Figure 4:
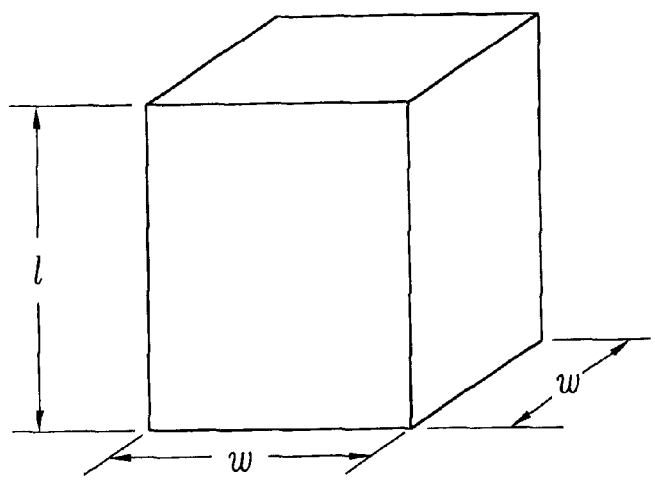
FIG. 4 is a perspective view of a representative p-type or n-type element.

In the present invention, the thermoelectric elements 32, 34 can be assumed to be rectangular prisms, each with a square base of dimension w, area $A=w^2$, and a height l as shown in FIG. 4. The aspect ratio AR of the thermoelectric elements 32, 34 is defined as AR=l/w. A large value of AR corresponds to tall narrow elements. The semiconductor elements 32, 34 that constitute the thermoelectric module will generally have dimensions that are approximately cubical, i.e., the ratio of length:width:depth is approximately 1:1:1. This construction allows a relatively high density of the thermoelectric couples within a given footprint.

Figure 5:
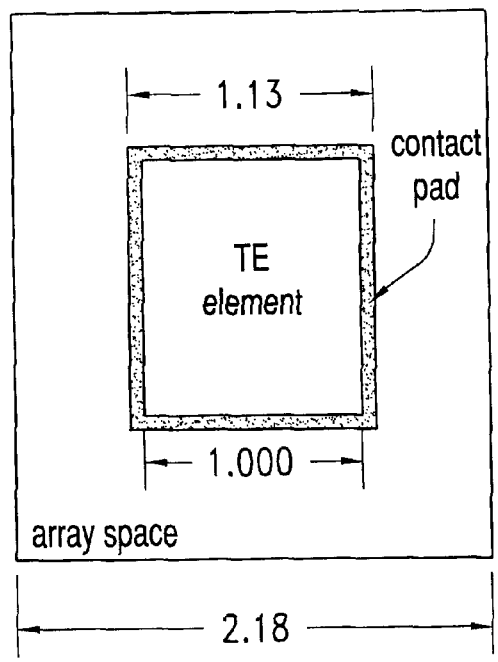
FIG. 5 is a top plan view of the footprint of a unit size p-type or n-type element.

In a preferred embodiment, the thermoelectric module 30 will include an array of alternating p-type 32 and n-type 34 semiconductor elements. Typically, the array is rectangular, and can be square. A metal contact pad area and inter-element space is shown in FIG. 5. Allowing for the metal contact pads and the spacing between elements, a p-type or n-type element of a unit width requires a square footprint measuring approximately 2.18 units on a side. Thus, the area occupied by a thermoelectric module composed of N p-n couples is the following:

Area=$2*(2.18)^2*N*w^2 = 9.5*N*w^2$.

The following material properties are typical for bismuth telluride based thermoelectric materials:

| | |
|---|---|
| Seebeck coefficient | $\alpha = 2.00 * 10^{-4}$ Volts/K |
| Thermal conductivity | $\kappa = 1.64 * 10^{-2}$ W/cm * K |
| Electrical Resistivity | $\rho = 1.01 * 10^{-3}$ Ohm * cm |

The thermal resistance of the thermoelectric module 30 composed of N couples (2N elements) is given by:

$$R_{TE} = \frac{l}{2N\kappa w^2}.$$

The temperature of the cold side of the thermoelectric module, $T_c$, is calculated from the following, $$\frac{T_h - T_c}{R_{TE}} = \frac{T_c - T_a}{R_{HS}} \rightarrow T_c = \left(\frac{1}{R_{HS}} + \frac{1}{R_{TE}}\right)^{-1}\left(\frac{T_h}{R_{TE}} + \frac{T_a}{R_{HS}}\right),$$

where $T_h$ is the hot side temperature, $T_a$ is the ambient temperature, $R_{TE}$ is the thermal resistance of the module and $R_{HS}$ is the thermal resistance of the heat sink that thermally couples the cold side of the module to the ambient environment.

Figure 6:
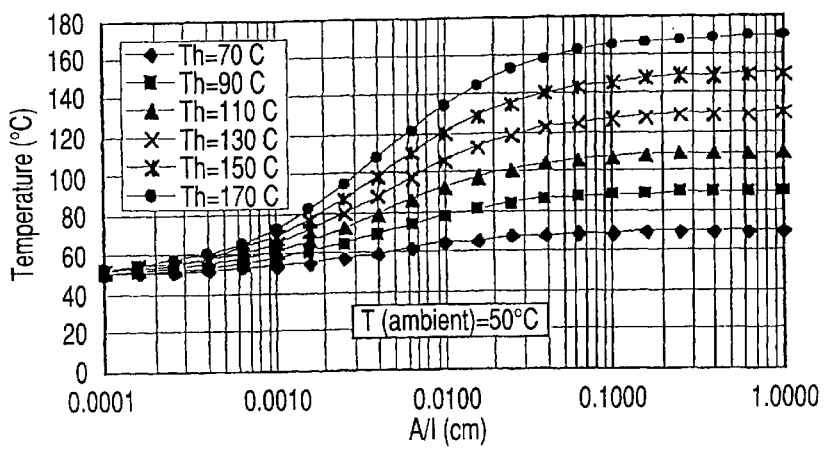
FIG. 6 is a graphical representation of the relationship among cold side temperature, A/l ratio and hot side temperature.

After computing $T_c$, the temperature gradient maintained across the module ($T_h-T_c$) is calculated. The relationship of cold side temperature, A/l and hot side temperature is shown in FIG. 6. The open circuit voltage generated by the thermoelectric module 30 can be determined by:

$E_{OC}=N\alpha(T_h-T_c)$.

The short circuit current generated by the thermoelectric module 30 depends upon the electrical resistance of the thermoelectric module, which is determined by the bulk resistance of the thermoelectric material and the contact resistance of the thermoelectric material to the metal wiring pads.

The contact resistivity of the semiconductor elements to the wiring metallization has been found to be approximately $2.5 \times 10^{-6}$ Ohm-cm$^2$. It is usually the case that the thermal contact resistance between the semiconductor elements and the wiring layer is negligible compared to the semiconductor bulk thermal resistance for sufficiently low N, i.e., N<500.

The bulk resistance of a single p-n couple is $R_b=2\rho l/w^2$, and the contact resistance of one couple is $R_c=4\sigma_c/w^2$ (the factor of 2 appears because each element has two contacts—top and bottom).

The cold side temperature and the thermoelectrically generated voltage are functions only of A/l, (the cross-sectional area of a single semiconductor element divided by its height), so two modules with the same A/l value will perform the same. The total resistance of a single p-n couple is:

$$R = R_b + R_c = \frac{2\rho}{A/l}\left(1 + 2\frac{\rho_c}{\rho}\frac{1}{l}\right) = \frac{2\rho}{A/l}\left(1 + 2\frac{\rho_c}{\rho}\frac{1}{AR*w}\right).$$

So, in the limit of vanishing contact resistance, the total module resistance is a function of A/l alone. However, for nonzero, contact resistance the total module resistance also depends on the height, l, of the elements.

The short circuit current generated by a thermoelectric module composed of N couples is:

$$I = \frac{E_{OC}}{NR}.$$

Figure 7:
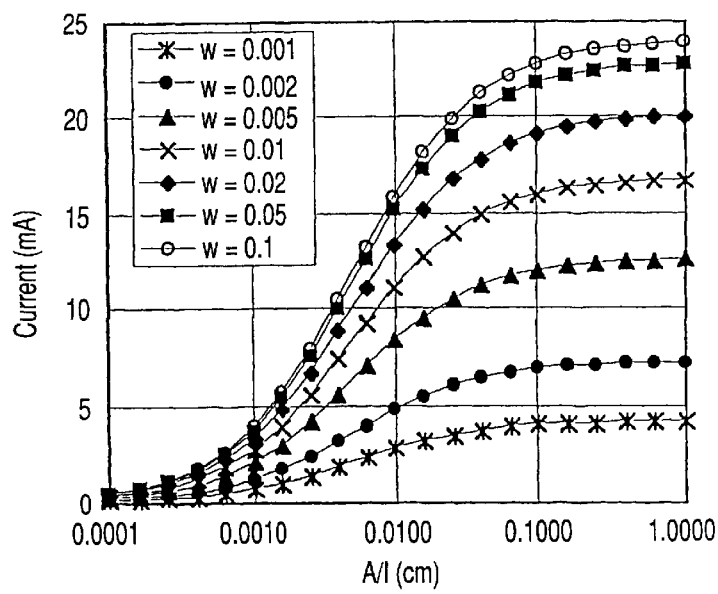
FIG. 7 is a graphical representation of the relationship of current to A/l ratio.

For a given A/l value, the current increases as the element width increases, with the effect being more marked at large values of A/l. That is, the contact resistance becomes less important as the element size increases. A representative current versus A/l and element width relationship is shown in FIG. 7. The relationship of A/l to the aspect ratio AR and the element width, w is $$\frac{A}{l} = \frac{w}{AR}$$

Thus, as the thermoelectric module elements are reduced in size, the required aspect ratio to achieve a given $$\frac{A}{l}$$

value also becomes smaller.

The maximum available electrical power from the thermoelectric module is $$P = \frac{1}{4}E_{oc} \times I_{sc}$$

For a thermoelectric module 30 having 300 thermoelectric couples with a dimension, w=0.01 cm, and $T_h-T_a=50°$ C.; AR=1, and $\rho=2.5\times10^6$ Ohm-cm$^2$, then $T_h-T_c=19.4°2$, E=1.6V; I=19 mA, and the available power P=7.5 mW. Such a module would have a total area of 0.3 cm$^2$ (a 0.55 cm square). It is noted that as the W of the p-type and n-type elements 32, 34 are reduced in size, the optimum aspect ratio for the element approaches 1. That is, the elements have a height that is substantially equal to their width. This aspect ratio provides for the manufacturing as set forth herein.

Figure 8:
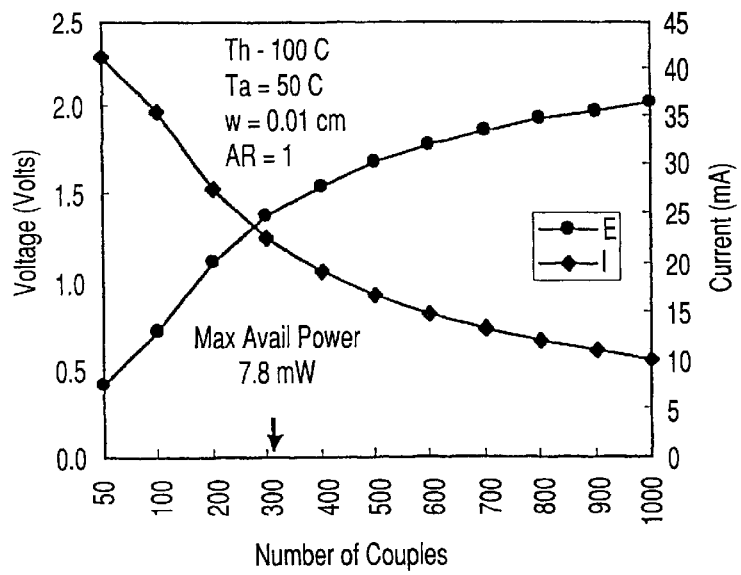
FIG. 8 is a graphical representation of thermoelectric module voltage and current with respect to the number of p-type n-type couples.

In order to power semiconductor electronics, the output voltage of the thermoelectric module 30 is preferably at least 1.0 volt. More preferably, the output voltage of the power supply module 30 is between approximately 3–5 volts. Using the equations presented above, and as seen in FIG. 8, it has been determined that power output is maximized when N is approximately 300 couples. This may be accomplished with a single thermoelectric module 30, or by a series of modules.

It is desirable to minimize the size of the thermoelectric module 30 so that a module can be used in confined spaces and in areas having weight or volume restrictions. To achieve this goal, a new design for a thermoelectric module 30 has been created.

The thermoelectric module 30 has a high-density of p-type elements 32 coupled to n-type elements 34. Preferably, the p-n couple density is approximately 1000 couples per square cm. A method for fabricating such an array includes forming an array of p-type semiconductor elements 32 on a first substrate, and an array of n-type semiconductor elements 34 on a second substrate. The first substrate is then connected to the second substrate, such that the p-type semiconductor elements 32 are interdigitated with the n-type semiconductor elements 34 to form the desired array of couples.

Using this construction method, p-n couples smaller than 0.025 inches on a side could be achieved. Thus, a p-n couple density greater than 1000 couples per square cm could be obtained. Preferably, the height of the p-type or n-type semiconductor elements 32, 34 is less than or equal to the greater of the two lateral dimensions of the elements. This density enables the generation of much greater power per unit area than previously attainable.

The scale of the present thermoelectric module 30 falls between the capabilities of present T/E module assembly technology, which employs semi-manual assembly techniques and advanced microlithographic fabrication technologies employed in semiconductor foundries. Fairly crude photolithographic techniques can be combined with electrochemical deposition and etching technologies to provide a fabrication technology suitable for the manufacture of present thermoelectric modules of the present scale.

Preparation of thick films $Bi_2Te_3$ up to 60 um thick by existing electrochemical deposition techniques could be employed. The compatibility of this process with electrode-posited copper electrodes and diffusion barrier layers may also be employed.

Three possible approaches are contemplated for forming the interleaved p-type and n-type elements 32, 34. The first two approaches depend upon determining an acceptable means of etching thick films of $Bi_2Te_3$. Possible approaches would employ suitable masking means, and various wet chemical etching techniques to form the desired pattern. An alternative approach includes reactive ion etching (RIE) for patterning thick films of $Bi_2Te_3$. An additional process includes thick-film printing techniques to form the elements.

Further, selective electrochemical deposition of $Bi_2Te_3$ may be employed. It is also contemplated that a first pattern of an electrode array is formed and then after masking certain areas of the substrate, pillars of n-type $Bi_2Te_3$ are electrochemically deposited. $Bi_2Te_3$ material of p and n type doping would be deposited in subsequent steps to form an array of couples.

The thermoelectric module 30 can employ quaternary alloys in the bismuth telluride family, which are composed of bismuth, tellurium, selenium, and antimony.

In addition to the thermoelectric module 30, the power supply module 20 can include a power conditioning circuit 40 and an active or passive radiator 50. For purposes of the present description, the term radiator is used to encompass a device that provides a relatively low thermal resistance between a system and a thermal reservoir that may be at either a higher or lower temperature than the system to which the radiator is thermally coupled. The radiator 50 can include fins, electric fans or a combination thereof.

The radiator 50 is often immersed in air at an ambient temperature $T_a$. The radiator 50 may be a phase change or a passive heat sink. Alternatively, as discussed herein, the radiator may cooperate with or include a fan 26. The radiator 50 provides a sufficient temperature differential between the hot side and the cold side of each p-n couple to create a voltage difference. Typically, the passive radiator 50 has a volume on the order of several cubic centimeters, with a thermal resistance of approximately 12° C./W.

Figure 9:
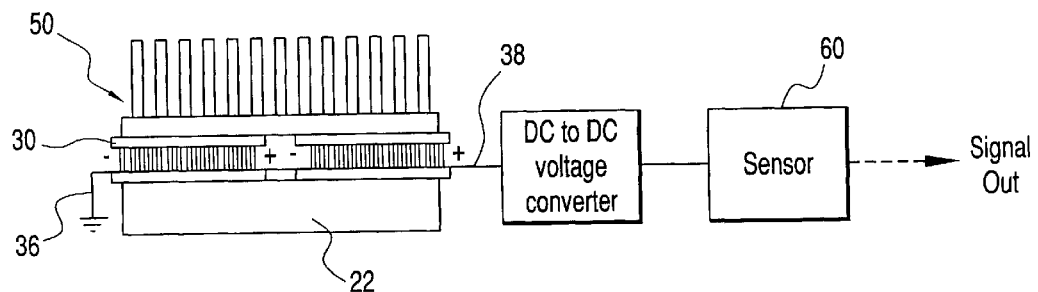
FIG. 9 is a representation of a first configuration of the power supply module.

FIG. 9 illustrates an embodiment having a power supply module 20 including thermoelectric modules 30 mounted between a base 22 and a passive radiator 50.

The base 22 is mounted to a surface at an elevated temperature, relative to the surrounding air thereby providing a hot side. In usage, it is expected this elevated temperature will be generated as a natural by-product of mechanical, electrical, or chemical processes. For example, internal combustion engines generate a large amount of heat, which is normally wasted through dissipative processes. A surface in contact or near contact with such an engine would be much warmer than the surrounding air.

Figure 10:
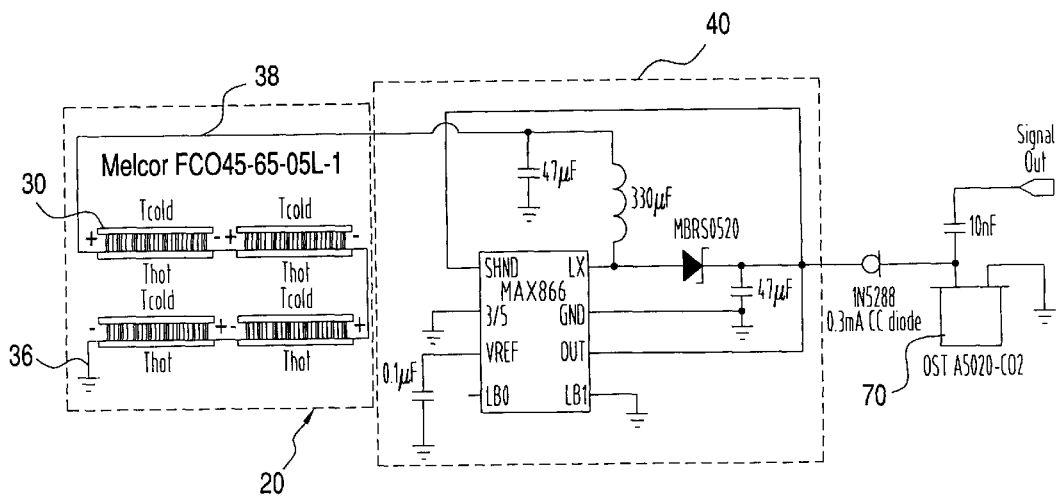
FIG. 10 is a wiring diagram of a configuration of the power supply module.

Referring to FIG. 10, an array of thermoelectric modules 30 such as the Melcor model FC045-65-05L-1 has been used. Typically, the thermoelectric modules 30 are connected electrically in series to provide a larger voltage for a given temperature gradient. The thermoelectric modules 30 are thermally connected in parallel.

The power supply module 20 can include the power conditioning circuit 40 including a DC to DC voltage converter 24 between the thermoelectric module 30 and the sensor module 60. A suitable DC to DC voltage converter is a Maxim MAX866 DC to DC voltage converter integrated circuit. The DC to DC voltage converter is in a standard configuration as recommended by the manufacturer.

The thermoelectric module 30 includes a first terminal 36 and a second terminal 38. One terminal 36 is grounded and the other terminal 38 is connected to the power conditioning circuit 40. A typical power conditioning circuit 40 is a CMOS switching regulator such as the DC to DC converter. The output voltage of the DC to DC converter is used to provide the power to the sensor module 60, such as shown in FIG. 9. The output of the DC to DC voltage converter can pass through a constant current diode to provide the bias current for the sensor module 60. As shown in FIG. 10, in a specific implementation, the constant current diode is an 1N5288 diode used and provides 0.3 mA direct current.

It is anticipated that the autonomous sensor system 10 must be able to commence operation under a variety of turn-on conditions. That is, the sensor system 10 needs to communicate data, even if the available temperature gradient is insufficient to initially operate the sensor module 60. Alternatively, for insufficient heat sink cooling capacity, the heat sink temperature may rise and a sufficient operating temperature gradient across the thermoelectric module 30 may not be achieved.

Figure 11:
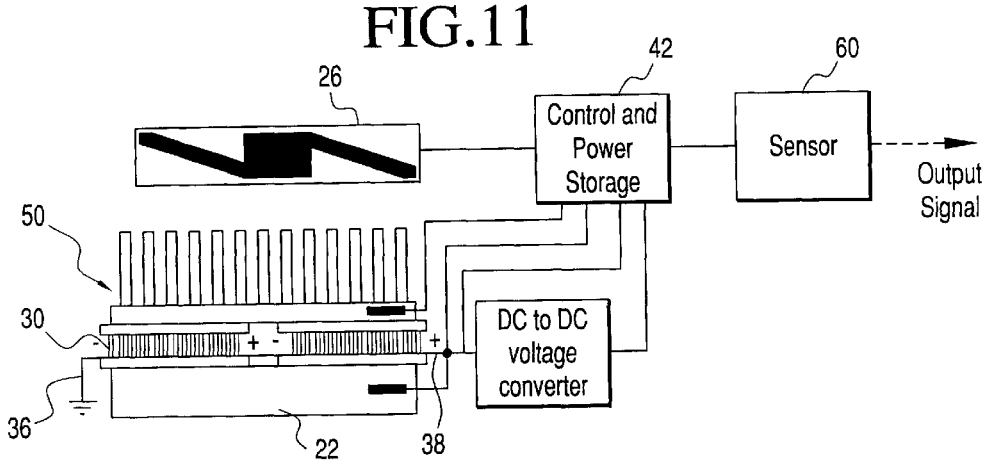
FIG. 11 is a representation of a further configuration of the power supply module and sensor module.
Figure 12:
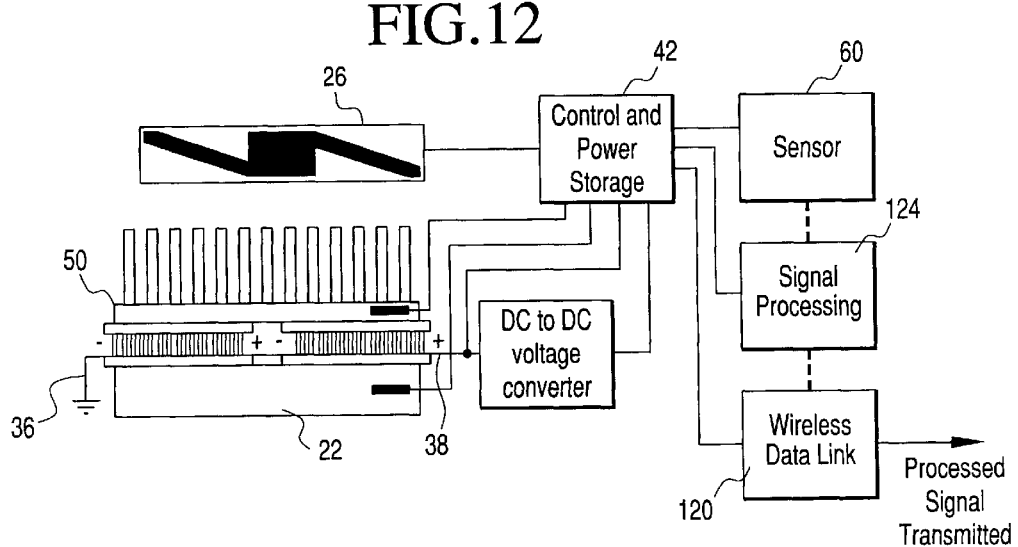
FIG. 12 is a representation of an alternative configuration of the autonomous sensor system.

Referring to FIGS. 11 and 12, a control and power storage module 42 can be located in the power supply module 20 to ensure reliable "start up" and continuous operation of the sensor system 10. The control and power storage module 42 may include a micro-controller. Alternatively, the control and power storage module 42 can be a dedicated discrete analog and/or digital electronic component. The control module 42 can also contain a rechargeable battery to provide the power to the fan 26 at start-up and to assure that a sufficient temperature gradient is maintained for continuous operation.

The control and power storage module 42 can control the DC to DC voltage converter. That is, DC to DC voltage converters often display hysteresis in their turn-on, turn-off voltage. The battery of the control and power storage module 42 can be used to start up the DC to DC voltage converter if the thermoelectric module 30 output voltage is too low to turn on the converter but high enough to maintain the converter once it has started.

As shown in FIGS. 11 and 12, the power supply module 20 can include the fan 26 to provide increased thermal conduction of the radiator 50. Increasing the airflow through the fins of the radiator 50 increases its cooling capacity to several times that for passive convective flow. This allows the maintenance of a greater temperature gradient across the thermoelectric modules 30 and thereby generation of greater electrical power. Forced-air cooling will also allow the power supply module 20 to operate with a reduced volume heat sink. A portion of the thermoelectrically generated power is used to operate the cooling fan 26. A low power miniature electric motor is available from Maxon Inc. and requires approximately 10 mA at 3 volts, and provides 10,000 rpm. A fan blade having an approximately 3 cm diameter is attached to the motor to provide an airflow velocity on the order of 1 to 10 m/s. Preferably, the fan 24 requires less than approximately six percent of the thermoelectrically generated power.

The power supply module 20 can include a feedback loop to monitor the "hot" and "cold" side temperatures of the thermoelectric modules 30. Temperature sensors 48 are located to monitor the "hot" and the "cold" side of the thermoelectric module 30. In response to the measured temperature, the control and power storage module 42 activates the fan 26 to control the temperature gradient.

Figure 13:
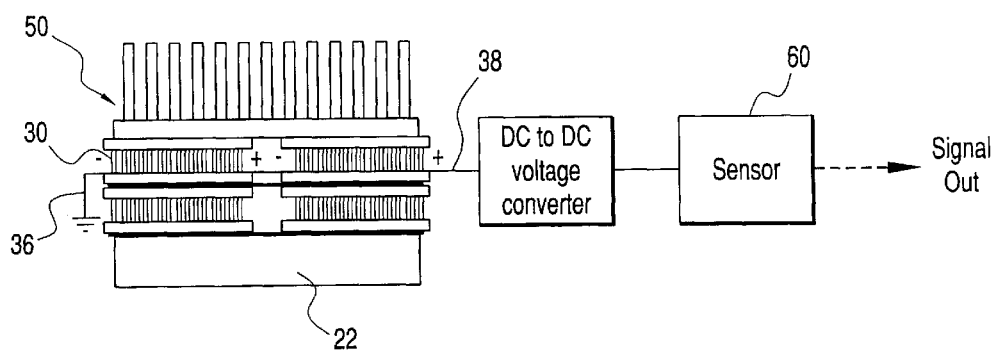
FIG. 13 is another configuration of the power supply module and the sensor module.

FIG. 13 shows a further embodiment of the power supply module 20 for operation at elevated base temperatures. Commercial thermoelectric modules that use alloys of bismuth, tellurium, selenium and antimony may operate at hot side temperatures up to 200° C. However, the temperature gradient from the hot to the cold side for such thermoelectric modules must remain less than 80° C. It is understood the environmental temperature differential can be substantially greater. By employing a series stack of thermoelectric modules 30 a sufficiently small temperature gradient across each module can be maintained. In FIG. 13, the thermoelectric modules 30 are connected thermally in series with a thermally conductive interface between modules.

In a preferred configuration, the power supply module 20 is exposed to at least an approximately 15° C. temperature differential and passively cooled, to produce approximately 5 to 10 mW. For a temperature differential of approximately 60° C., approximately 0.5W or more power is produced.

|  | Passively cooled power supply module at approximately 17° C. ΔT with 40 cm³ | Actively cooled heat sink, hot side temperature of 120° C. with 40° C. ambient air temperature |
| --- | --- | --- |
| Design Parameters |  |  |
| N (# of TE couples) | 127 | 127 |
| A/1 (cm) | 0.016 cm | 0.080 cm |
| $T_h$ (° C.) | 55° C. | 120° C. |
| $T_a$ (° C.) | 25° C. | 40° C. |
| $V_{hs}$ (cm³) | 40 cm³ | 40 cm³ |
| Performance Parameters |  |  |
| $R_{TE}$ (° C./W) | 15 | 3 |
| $R_{TE}$ (° C./W) | 12.5 | 1.25 |
| $T_c$ (° C.) | 38.6° C. | 63.5° C. |
| ΔT (° C.) | 16.4° C. | 56.5° C. |
| $E_L$ (Volts) | 0.42 | 1.44 |
| $I_L$ (milliAmps) | 17 | 360 |
| $Q_L$ (mW) | 7.3 | 520 |

Sensor Module

The sensor module 60 is connected to the power supply module 20 and the communication module 120. Although a single sensor 70 is shown in the sensor module 60, it is contemplated that a plurality of similar or different sensors can be employed in the sensor module depending upon power requirements and available power. The sensor 70 senses a condition of the environment and creates a corresponding sensor signal.

Preferably, the sensor module 60 requires a voltage of between approximately 3.3 volts to approximately 5.0 volts, with a required power of less than approximately 500 mW. Depending upon the intended operating environment, the sensor module 60 can include packaging or a housing to protect the sensor 70 from detrimental aspects of the environment.

Any of a variety of sensors 70 can be employed in the sensor module 60. The sensors 70 can be chemical or mechanical including, but not limited to pressure, temperature, acceleration, pH, liquid level proximity, vibration, force, chemical species and gas. Further examples of sensors 70 include pressure transducers, displacement sensors, velocity sensors, and rotation sensors.

An Oceana Sensors Technology model OST AS5020-C02 piezoelectric accelerometer has been employed as the sensor 70. The output signal of the sensor 70 can be coupled through a capacitor 22, such as a 10 nF capacitor, to block the DC bias voltage.

Communication Module

The communication module 120 is connected to the power supply module 20 and the sensor module 60 to broadcast or transmit a sensor signal to a remote location. The effective transmission distance of the communication module 120 ranges from approximately ten meters to approximately 100 meters. The transmission is via a free space wireless link.

The communication module 120 includes a transmitter for transmitting the sensor signal to the remote location. The wireless communication includes, but is not limited to, radio frequency signals, infrared, visible, sound, optical, microwave as well as ultrasonic waves. The communication module 120 can include a signal processor 124, such as a digital signal processor for preparing a signal for transmission.

Signal processing of the sensor signal may be employed prior to transmittng the signal. Illustrative signal processing includes computing the (root mean square) RMS vibration level or vibration level spectral density. Other such parameters as dictated by machine health monitoring decisions can be determined through the signal processing. The signal conditioning can employ any of a variety of signal conditioning circuits including, but not limited to active or passive electronic impedance converting circuits, amplifiers, electro-acoustic or electro-optical signal conditioning, electronic analog filtering circuits, analog to digital conversion as well as digital filtering and data manipulation. Analog or digital signal processing circuits can be incorporated. That is, it is contemplated the communications module 120 or the power supply module 20 can include an analog to digital converter 130. The analog to digital converter 130 preferably requires approximately 3.3 to approximately 5.0 volts. The communication module 120 may include or cooperate with a storage device for retaining processed sensor signals. Thus, a transmission may be a single data point or a group of data points. The transmissions may be continuous or periodic with a frequency of seconds to days.

An anticipated power budget, for such a system 10 is:

| Component | Power Required |
|---|---|
| Sensor | 1.5 mW |
| Signal conditioning | 0.2 mW |
| A/D converter | 1.0 mW |
| Communications module | 1.0 mW Intermittant (100 mW Maximum) |
| Total requirements | 4.2 mW average |

It is understood the power supply module 20, sensor module 60 and communication module 120 can be packaged in a common housing. Alternatively, any two of the three modules can be within a common housing, wherein the remaining module is spaced apart and interconnected by a wire.

Operation

In operation, the autonomous sensor system 10 is located at the desired location relative to the target device for monitoring the target device. Typically upon operation of the target device, a temperature differential is created across the thermoelectric modules. It is understood the system may employ thermal energy from a source other than the target device. The thermoelectric module converts this scavenged thermal differential to a voltage, which is applied to the sensor module 60 and the communication module 120.

The powered sensor module 60 responds or reacts to the surrounding environment, or the target device to create a sensor signal. The sensor signal passes through a signal conditioning circuit, such as the analog to digital converter 130.

The processed sensor signal then passes to the communication module 120, where the processed sensor signal is wirelessly communicated to a remote receiver. It is understood the transmission may be real time, or data may be grouped and transmitted in a time-compressed manner.

While there has been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

What is claimed:

1. An autonomous sensor system for an operating environment, comprising:

(a) a common housing;

(b) a thermoelectric module selected to generate electricity from thermal energy in the operating environment within the common housing;

(c) a sensor for generating a measurement signal within the common housing; and (d) a transmitter within the common housing connected to the thermoelectric module and the sensor for receiving the sensor signal and transmitting a wireless corresponding signal.

2. The sensor system of claim 1, where the thermoelectric module includes approximately 300 p-type, n-type semiconductor couples.

3. The sensor system of claim 1, wherein the sensor includes one of a mechanical, chemical, thermal, optical, acoustic, electrical, nuclear, magnetic and electromagnetic sensor.

4. The sensor system of claim 1, further comprising one of a voltage converter and a regulator operably connected to the thermoelectric module.

5. The sensor system of claim 1, further comprising a signal processor intermediate the sensor and the transmitter.

6. The sensor system of claim 1, further comprising a fan powered by the thermoelectric module.

7. The sensor system of claim 1, wherein the thermoelectric module is thermally coupled to scavenge thermal energy from the operating environment.

8. The sensor system of claim 1, wherein the thermoelectric module is thermally coupled to dedicated thermal energy from the operating environment.

9. The sensor system of claim 1, further comprising a radiator thermally coupled to the thermoelectric module.

10. The sensor system of claim 9, wherein the radiator is one of a phase change and a passive heat sink.

11. The sensor system of claim 1, wherein the thermoelectric module includes an array of p-type semiconductor elements and an array of n-type semiconductor elements.

12. The sensor system of claim 11, wherein the p-type semiconductor elements have a height that is less than or equal to the greater of a remaining lateral dimension of the semiconductor element.

13. The sensor system of claim 11, where the array of p-type elements and the array of n-type elements have density of more than 1000 per square centimeter.

14. The sensor system of claim 11, wherein each of the p-type semiconductor elements and n-type semiconductor elements have a length less than approximately 0.01 centimeters, a width and a height less than approximately 0.01 centimeters.

15. A sensor system for an operating environment, comprising:

(a) a thermoelectric module having a first side and a second side;

(b) a radiator thermally coupled to the second side to provide a sufficient temperature differential between the first side and the second side to create a voltage difference across the thermoelectric module;

(c) a sensor electrically powered by the thermoelectric module to generate a signal; and (d) a wireless data link connected to the sensor and powered by the thermoelectric module to generate a free space transmission corresponding to the signal.

16. The sensor system of claim 15, wherein the radiator is one of a phase change and passive heat sink.

17. The sensor system of claim 15, wherein the sensor comprises one of a mechanical, chemical, thermal, optical, acoustic, electrical, nuclear, magnetic and electromagnetic sensor.

18. The sensor system of claim 15, further comprising one of a voltage converter and regulator operably connected to the thermoelectric module.

19. The sensor system of claim 15, wherein the radiator is an active cooler including a fan.

20. The sensor system of claim 15, further comprising a signal conditioning circuit intermediate the sensor and the wireless data link.

21. The sensor system of claim 20, wherein the signal conditioning circuit includes one of an amplifier, a filter, and an analog to digital converter and a digital signal processor.

22. A method of forming a thermoelectric module having a plurality of p-n semiconductor couples, comprising:
(a) forming a first array of p-type semiconductor elements on a first substrate;
(b) forming a second array of n-type semiconductor elements on a second substrate; and
(c) connecting the first substrate and the second substrate to dispose the first array of p-type semiconductor elements and the second array of n-type semiconductor elements intermediate the first substrate and the second substrate.

23. The method of claim 22, further comprising interdigitating the first array of p-type semiconductor elements with the second array of n-type semiconductor elements.

24. The method of claim 22, further comprising forming the first array of p-type semiconductor elements with each p-type semiconductor element having a height that is less than or equal to a greater of the remaining lateral dimension of the semiconductor element.

25. The method of claim 22, further comprising forming the second array of n-type semiconductor elements with each n-type semiconductor element having a height that is less than or equal to the greater of the remaining lateral dimension of the semiconductor element.

26. A thermoelectric module for generating a voltage difference from exposure to a temperature differential, comprising a first array of p-type semiconductor elements thermally coupled to a second array of n-type semiconductor elements, where each p-type and each n-type semiconductor element has a height that is less than or equal to the greater of a remaining lateral dimension of the semiconductor element, each of the height and lateral dimensions being less than approximately 0.01 centimeters.

27. A thermoelectric module for generating a voltage difference from a temperature differential, comprising p-n couples having an aspect ratio of 1:1:1.

28. A thermoelectric module for generating a voltage difference from a temperature differential, comprising a p-n semiconductor couple density greater than 1,000 p-n semiconductor couples per square centimeter.

29. An autonomous sensor system in an operating environment, comprising:
(a) a thermoelectric module comprising p-n couples having an aspect ratio of 1:1:1 selected to generate electricity from thermal energy in the operating environment;
(b) a sensor for generating a sensor signal; and
(c) a transmitter connected to the thermoelectric module and the sensor for receiving the sensor signal and transmitting a wireless corresponding signal.

30. The sensor system of claim 29, wherein the thermoelectric module includes an array of p-type semiconductor elements and an array of n-type semiconductor elements.

31. The sensor system of claim 29, wherein the p-type semiconductor elements have a height that is less than or equal to the greater of a remaining lateral dimension of the semiconductor element.

32. The sensor system of claim 29, where the array of p-type elements and the array of n-type elements have density of more than 1000 per square centimeter.

33. The sensor system of claim 29, where the thermoelectric module includes approximately 300 p-n semiconductor couples.

34. The sensor system of claim 29, wherein each of the p-type semiconductor elements and n-type semiconductor elements have a length less than approximately 0.01 centimeters, a width and a height less than approximately 0.01 centimeters.

35. The sensor system of claim 29, further comprising a radiator thermally coupled to the thermoelectric module.

36. The sensor system of claim 29, wherein the radiator is one of a phase change and a passive heat sink.

37. The sensor system of claim 29, wherein the sensor includes one of a mechanical, chemical, thermal, optical, acoustic, electrical, nuclear, magnetic and electromagnetic sensor.

38. The sensor system of claim 29, further comprising one of a voltage converter and a regulator operably connected to the thermoelectric module.

39. The sensor system of claim 29, further comprising a signal processor intermediate the sensor and the transmitter.

40. The sensor system of claim 29, further comprising a fan powered by the thermoelectric module.

41. The sensor system of claim 29, wherein the thermoelectric module is thermally coupled to scavenge thermal energy from the operating environment.

42. An autonomous sensor system in an operating environment, comprising:
(a) thermoelectric module comprising p-n couples having an aspect ratio of 1:1:1 selected to generate electricity from thermal energy in the operating environment that comprises two or more stacked thermoelectric devices;
(b) a sensor for generating a sensor signal; and
(c) a transmitter connected to the thermoelectric module and the sensor for receiving the sensor signal and transmitting a wireless corresponding signal.

* * * * *